Dec. 1, 1942.  E. W. SMITH  2,303,407

CLUTCH MECHANISM

Original Filed Oct. 8, 1937  3 Sheets-Sheet 1

Inventor:
Edward W. Smith.
his Attorney.

Dec. 1, 1942.   E. W. SMITH   2,303,407
CLUTCH MECHANISM
Original Filed Oct. 8, 1937   3 Sheets-Sheet 3

Inventor:
Edward W. Smith
his Attorney.

Patented Dec. 1, 1942

2,303,407

UNITED STATES PATENT OFFICE 2,303,407

CLUTCH MECHANISM

Edward W. Smith, Melrose, Mass., assignor to Submarine Signal Company, Boston, Mass., a corporation of Maine Original application October 8, 1937, Serial No. 168,033. Divided and this application May 25, 1940, Serial No. 337,246

6 Claims. (Cl. 192—68)

This application is a division of my copending application Serial No. 168,033, filed October 8, 1937.

The present invention relates to a clutch mechanism for coupling a vibratory system to a source of vibratory energy in such a manner as to permit variation of the vibrational amplitude transmitted from the source to the vibratory system. The present invention is particularly adaptable to use in connection with the starting of multiple mass resonant vibratory systems as, for example, Fourdrinier paper machine shaking systems of the type described in my United States Patents Nos. 2,070,757 and 2,070,929 in accordance with the method set forth in my said application Serial No. 168,033.

One of the objects of the present invention is to provide a simple and relatively inexpensive device for coupling a vibratory driving motor to a vibratory system after the driving motor has reached resonant speed.

A further object of the present invention is to provide a means for gradually increasing and decreasing the amplitude of motion transferred from a constant amplitude driving motor to a vibratory system.

Figure 1:
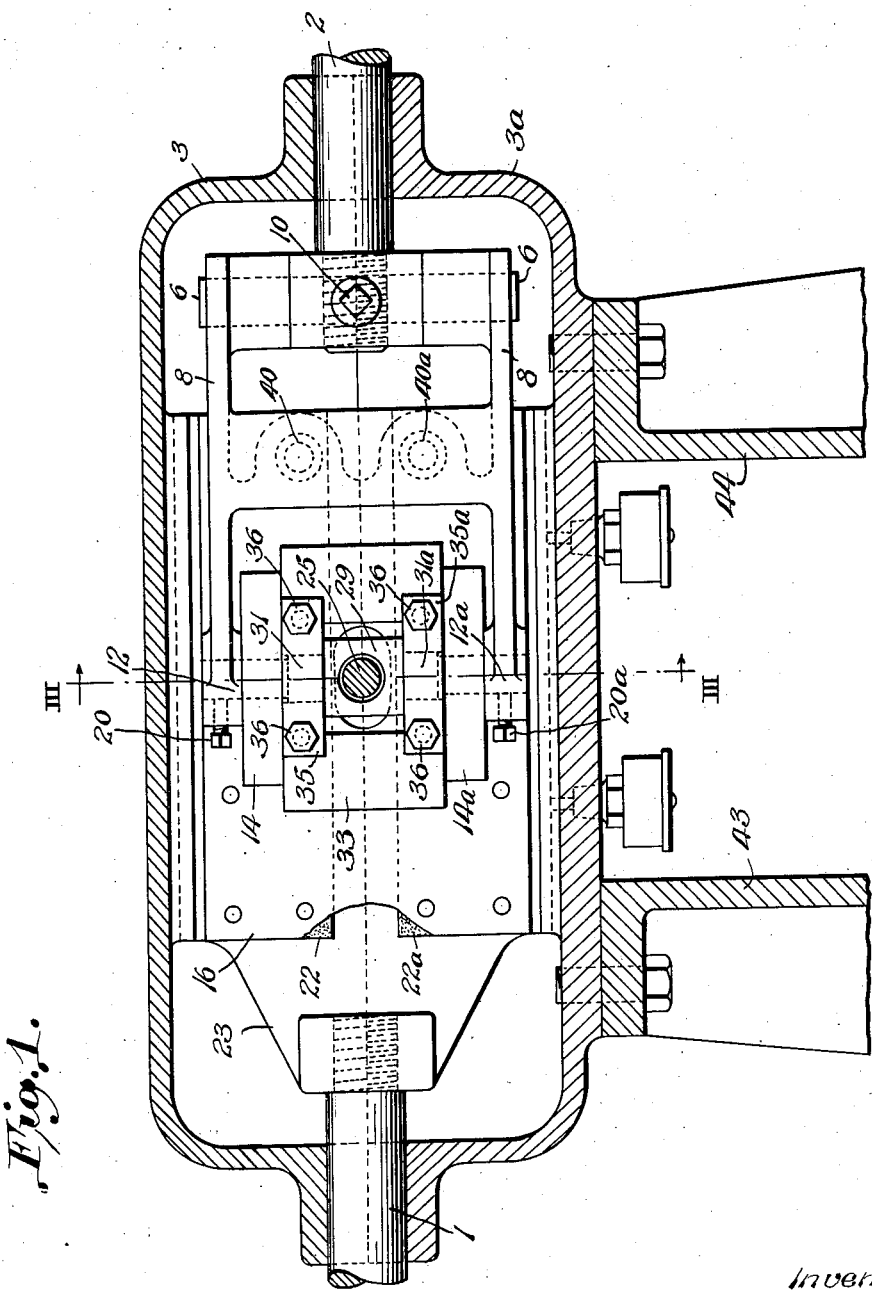
Figure 2:
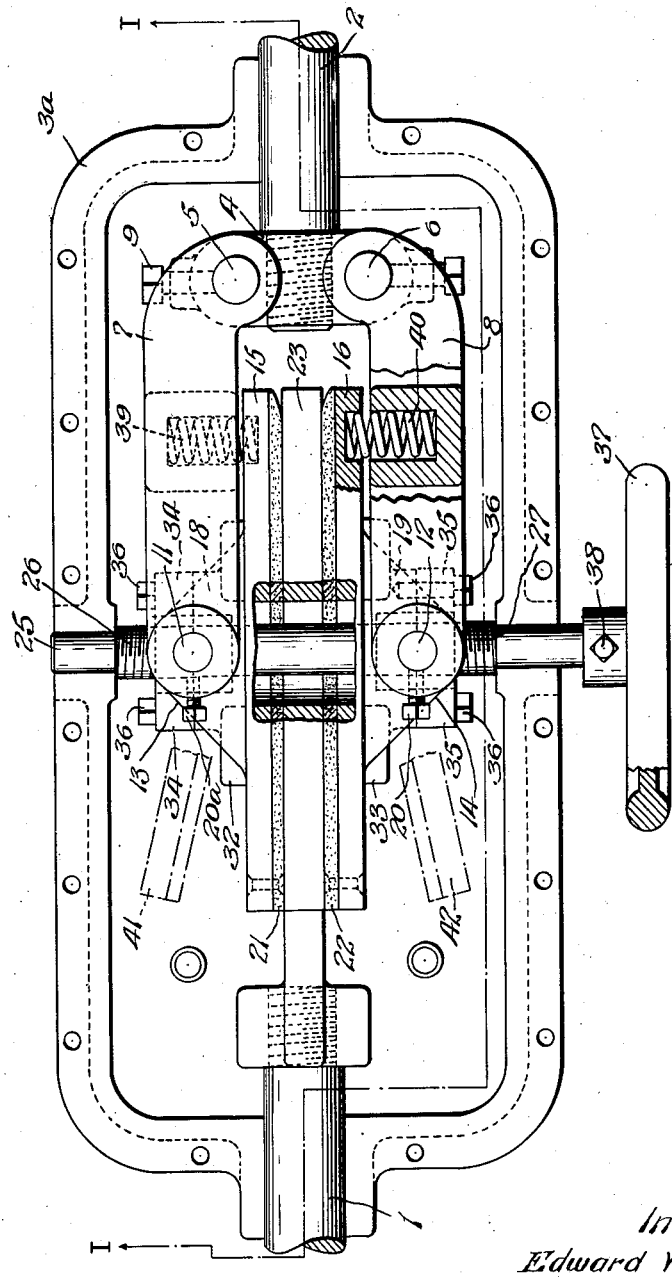
Figure 3:
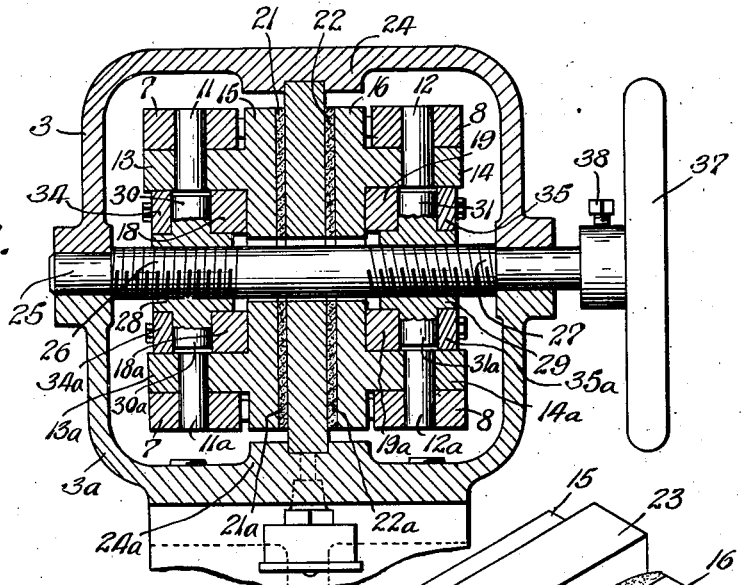
Figure 4:
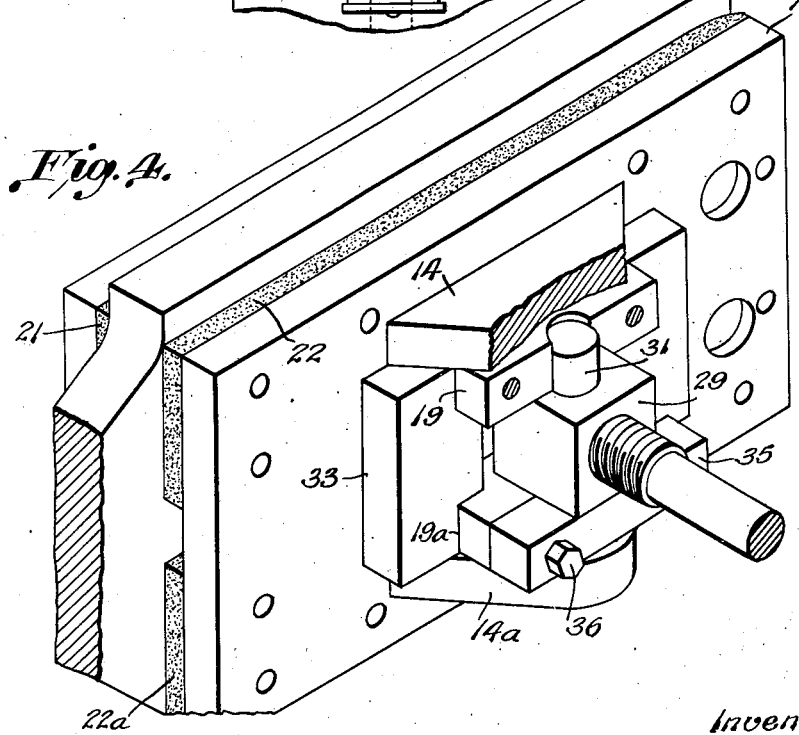

Other objects of the present invention and the construction of operation of the same will best be understood from the following description taken in connection with the accompanying drawings in which Fig. 1 shows the clutch in elevation but with the outer casing in section as indicated by the line I—I in Fig. 2; Fig. 2 shows a plan view of the clutch mechanism with half of the outer casing removed; Fig. 3 shows a cross section through the center of the clutch along the line III—III of Fig. 1; and Fig. 4 shows in perspective the central portion of the clutch.

A driving motor through suitable crank or eccentric mechanism is directly coupled to the shaft 1 which is free to vibrate in the direction of its axis. The shaft 2 at the other end of the clutch is also free to vibrate in the direction of its axis and is directly coupled to one of the masses forming the vibratory system.

The two shafts 1 and 2 are slidably mounted in a casing which is formed in two halves 3 and 3a and encloses substantially the entire mechanism. The lower half 3a of the casing is supported in any convenient way on the brackets 43, 44. At the inner end of the shaft 2 is mounted an arm 4 at each end of which there is provided a trunnion 5 and 6 on which, in turn, are mounted forked motion-transmitting members 7 and 8, respectively. The trunnions are held in place by the set screws 9 and 10, respectively. The members 7 and 8 are also forked at their ends opposite the shaft 2 where they are supported on trunnions 11, 11a and 12, 12a, respectively, fixed to the forked members by the set screws 19, 19a and 20, 20a. The trunnions in question are mounted in bearings in ears 13, 13a and 14, 14a which are preferably made integral with plates 15, 16, respectively. On the inner sides of the plates 15 and 16 friction shoes 21, 21a and 22, 22a, respectively, are fixed and adapted to engage a central plate 23 which is rigidly fixed to the shaft 1. The plate 23 slides in channels cut in bosses 24 and 24a on the two halves of the casing 3, 3a.

From the description so far given it will be understood that the plates 15 and 16 when vibrated transmit their motion through the members 7 and 8 to the shaft 2. In order, however, to make possible the transmission of motion from the plate 23 to the plates 15 and 16 it is necessary to apply pressure to these plates. This is accomplished in the following manner.

A shaft 25, journaled in the casing, passes through an aperture in the plates 15, 16 and 23. At one end of the shaft 25 there is fastened a handwheel 37 by means of the set screw 38. Portions 26 and 27 of the shaft 25 are threaded, one left hand, the other right hand, into blocks 28 and 29 integral with which are the trunnions 30, 30a and 31, 31a, respectively. These trunnions are supported in bearings in shoulders 18, 18a and 19, 19a formed integrally with plates 32 and 33 which slide freely upon the members 15 and 16, respectively. The trunnions 30, 30a and 31, 31a are held in place by caps 34, 34a and 35, 35a which are fastened to the shoulders by cap screws 36.

It will be apparent now that when the handwheel 37 is turned, say in a counter-clockwise direction, the blocks 28 and 29 will tend to move inward toward the center of the shaft, thus by means of the trunnions 30, 30a and 31, 31a pressing the plates 32, 33 against the plates 15 and 16 and therefore pressing the friction shoes on the latter into contact with the plate 23.

On the other hand, when the handwheel 37 is turned in a clockwise direction, the blocks 28 and 29 will tend to move outwards along the shaft 25, thereby relieving the pressure between the plates 15, 16 and 23. In order to bring about a more gradual contact and release between the friction shoes and the plate 23, springs 39, 39a and 40, 40a are mounted in recesses in the members 7, 8 and 15, 16. Thus, when the handwheel has been turned to spread the blocks 28, 29 as far apart as possible, the springs 39, 39a (not shown) and 40, 40a will continue to hold the right-hand ends of the plates 15 and 16 as seen in Fig. 2 with their friction shoes lightly in contact with the plate 23 whereas the left-hand ends of the plates 15 and 16 will occupy the positions 41, 42 shown with dash-dot lines in Fig. 2.

In operation, having adjusted the handwheel so that the plates 15 and 16 occupy the positions 41 and 42, the driving motor is brought up to resonant speed, thereby, through the crank mechanism, rapidly oscillating the shaft 1 and the plate 23 at its maximum amplitude. At this time, since only a small portion of the plates 15 and 16 is in contact with the plate 23, very little vibratory energy will be transmitted to the shaft 2 and the vibratory system. As the handwheel is now turned to bring the blocks 28 and 29 closer together and consequently also to bring the plates 15 and 16 closer to the plate 23, more and more surface of the friction shoes will come into contact with the plate 23, thus permitting less and less slip between these members and urging the shaft 2 into longitudinal vibration at a greater and greater amplitude until finally the three plates are tightly clamped together.

It will be noted that by the arrangement described not only does the mechanism described function as a clutch by which it is possible gradually to increase and decrease the amplitude with which a system vibrating at a constant amplitude drives a second system, but also this can be accomplished merely by turning a stationary handwheel.

While my invention has been described with reference to a Fourdrinier paper machine, it will be obvious to those skilled in the art that it may similarly be applied to resonant shaking systems for cylinder or other paper machines or to resonant vibratory systems other than paper machines.

Having now described my invention, I claim:

1. A clutch for coupling a vibratory motor to a load to be vibrated comprising an elongated casing, an elongated plate adapted to slide within said casing, means for coupling the plate to said driving motor, a pair of friction plates adapted to contact said first plate one on each side thereof, means for coupling said friction plates to said vibratory mechanism, all of said plates having coaxial apertures therein, a shaft passing through said apertures and journaled in the sides of said casing, said shaft being threaded in opposite directions at opposite ends thereof, a pair of threaded members adapted to move in opposite directions upon said shaft when the latter is rotated, and a third pair of plates positioned in sliding engagement with said friction plates and supported by said threaded members.

2. A clutch for coupling together two aligned reciprocating bars comprising a fixed casing in which said bars are journaled, clutch plates operatively connected to said bars, means mounting said clutch plates in opposed relation to each other with at least one pivotally supported from said bars, spring means positioned between said means mounting said clutch plates and said plates for tensioning said plates away from said mounting means, and means fixedly supported in said casing and movably connected with said plates for advancing and retracting said plates into and away from engagement respectively with each other whereby the coupling and decoupling of said bars are obtained.

3. A clutch for coupling together two aligned reciprocating bars comprising a fixed casing in which said bars are journaled, clutch plates operatively connected to said bars, means rigidly joining one of said clutch plates to one bar, means mounting said other clutch plates in opposed relation to said first plate on either side thereof with means pivotally supporting said plates from said other bar, spring means positioned at one side of said pivotal supporting means for tensioning said plates away from said pivotal supporting means and means fixedly supported in said casing and positioned to operate against said pivotal supporting means in the vicinity of said pivots for advancing and retracting said plates into and away from engagement respectively with each other whereby the coupling and decoupling of said bars are obtained.

4. A clutch for coupling together two aligned reciprocating bars comprising a fixed casing in which said bars are journaled, a center clutch plate fixedly connected to one of said bars, means including supporting members for pivoting a pair of clutch plates in opposed relationship to said first plate at the opposite faces thereof, a pair of pivoted links pivoted at one end to said other bar and carrying at the other end the supporting members for the first pivoting means, spring means positioned between said links and said pivoted clutch plates for tensioning said plates away from said links and means fixedly supported in said casing and movably connected with said plates for advancing and retracting said plates into and away from engagement respectively with each other whereby the coupling and decoupling of said bars are obtained.

5. A clutch for coupling together two aligned reciprocating bars comprising a fixed casing in which said bars are journaled, a central clutch plate fixed to one of said bars, a pair of clutch plates positioned one at either side of said central plate with the surfaces thereof opposed respectively to opposite surfaces of said central plate, means adjustably mounting said second set of plates from said second bar and means including in part said mounting means for bringing the surfaces of said set of plates in contact with said central plate gradually from one end thereof over the whole surface.

6. A clutch for coupling together two aligned reciprocating bars comprising a fixed casing in which said bars are journaled, a central clutch plate mounted to one of said bars, a pair of clutch plates, means adjustably connecting said clutch plates to the other of said bars and positioned with the surfaces thereof in opposed relation at each side of said central plate, means fixedly mounted and supported in said casing and having spring reaction means yieldingly bearing between said fixedly mounted means and said pair of plates for retracting the surfaces of said pair of plates from the surfaces of said central plate and means operable to bring said pair of clutch plates into face engagement with the central clutch plate whereby the coupling and decoupling of said bars are obtained.

EDWARD W. SMITH.